United States Patent [19]

Brunner

[11] 4,381,801

[45] May 3, 1983

[54] THERMAL INSULATION FOR PIPES AND METHOD FOR FABRICATING THE SAME

[75] Inventor: Alfred Brunner, Winterthur, Switzerland

[73] Assignee: Sulzer Brothers Limited, Winterthur, Switzerland

[21] Appl. No.: 67,704

[22] Filed: Aug. 17, 1979

[30] Foreign Application Priority Data

Aug. 31, 1978 [CH] Switzerland .......................... 9191/78

[51] Int. Cl.³ .............................................. F16L 9/14
[52] U.S. Cl. .................................... 138/148; 138/149; 138/172
[58] Field of Search ............... 138/120, 148, 149, 172, 138/113, 114, 38, 131, 139; 165/179

[56] References Cited

U.S. PATENT DOCUMENTS

| 1,411,960 | 4/1922 | Doino | 138/148 |
|---|---|---|---|
| 1,440,508 | 1/1923 | Todd | 138/139 X |
| 1,962,428 | 6/1934 | Colbie | 138/148 X |
| 2,894,537 | 7/1959 | Carr | 138/148 X |
| 3,602,630 | 8/1971 | Sassin | 138/114 X |

Primary Examiner—Frederick R. Schmidt
Attorney, Agent, or Firm—Kenyon & Kenyon

[57] ABSTRACT

The thermal insulation is formed of a plurality of sheet metal elements which are aligned in interfitting manner to define a multiplicity of cells for disposition within or about a pipe or tube. The elements rest against the wall of the tube in a resilient manner and the cells defined by the elements retard heat transfer to and from the pipe wall.

12 Claims, 7 Drawing Figures

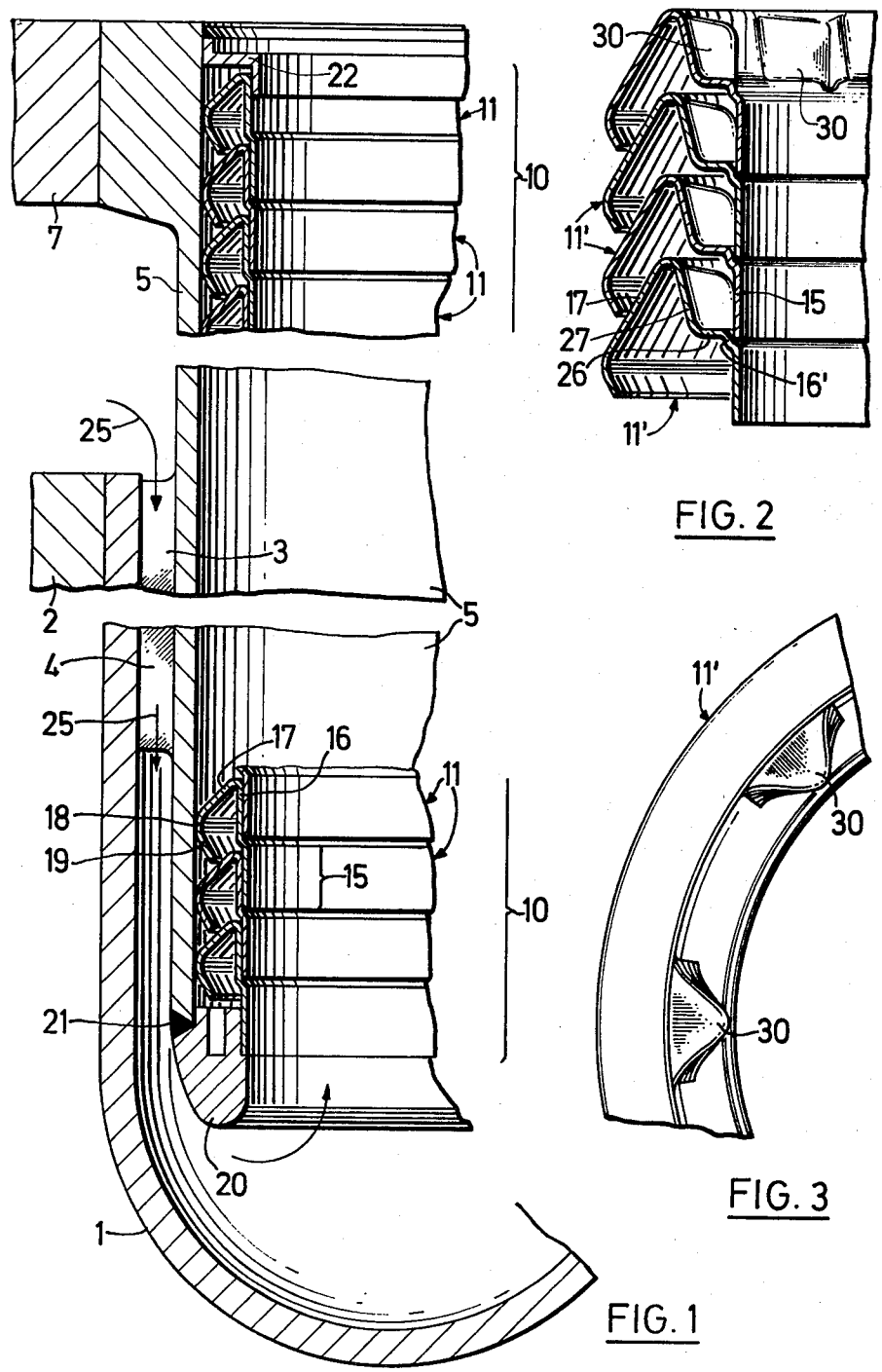

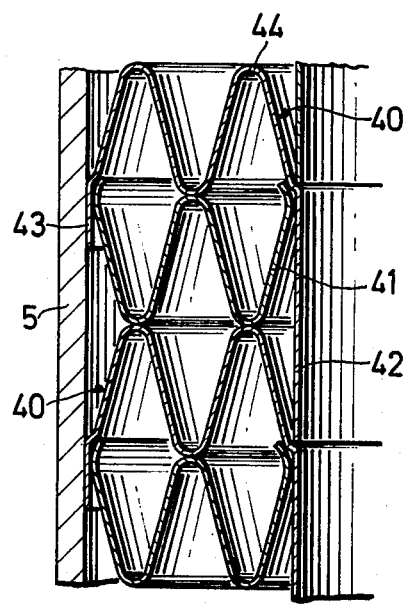
FIG. 4
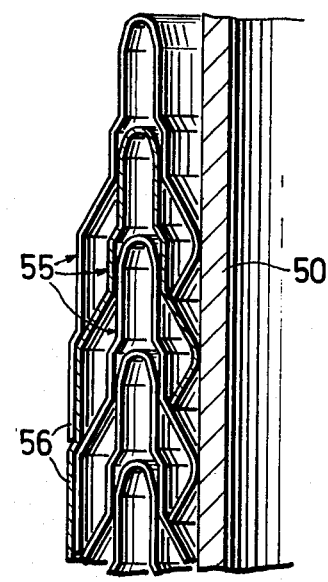
FIG. 6
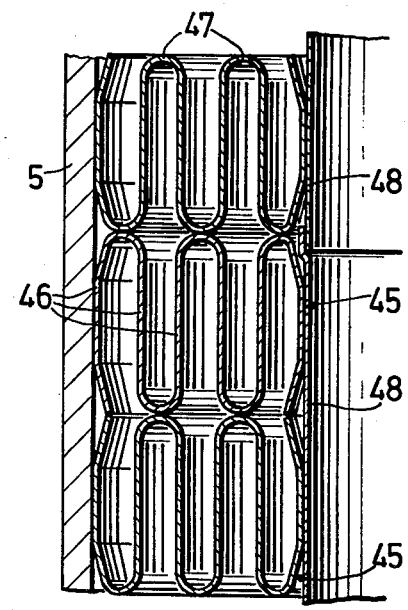
FIG. 5
FIG. 7
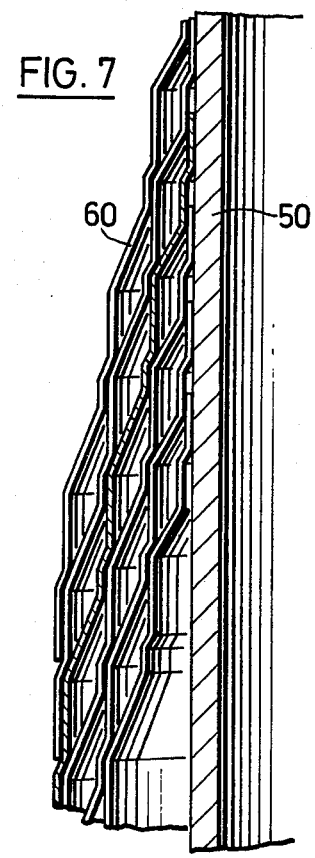

THERMAL INSULATION FOR PIPES AND METHOD FOR FABRICATING THE SAME

This invention relates to thermal insulation for pipes and to a method for fabricating the same. More particularly, this invention relates to thermal insulation which can be disposed within or about a pipe.

Heretofore, it has been known to thermally insulate pipes and vessels in order to reduce heat transfer through a wall of the pipe or vessel, or to protect the wall against extreme temperatures or temperature gradients. Generally, for this purpose, materials with low heat conductivity are used, especially materials which have cells in which poorly conductive materials are imbedded. Materials which are especially advantageous in this respect are foamed plastics. However, these materials are not suitable if high temperatures occur. In such cases, pilings or mattings of material fibers or ceramic insulation are often used. These latter materials have a disadvantage, however, in that they tend to form dust or are brittle to thermal shock.

It has also been proposed to use layers of sheet metal for insulation purposes. In such cases, relatively large cells are usually formed to extend along substantial distances in the axial direction of the pipe. Also, ribs or bumps have been imposed in the sheet metal layers for spacing the layers from each other. It has also been known to use the so-called ALFOL insulation in which cells are formed by wrinkled aluminum foil. However, these metallic insulators have the disadvantage that they can be adversely affected by shock stresses either due to acceleration or through pressure variations. It has also been difficult to accommodate these metallic insulators in a small space. Still further, it has been found that the insulating properties of the metallic insulators can vary to a large extent in local regions.

Accordingly, it is an object of the invention to provide a metallic insulation which yields highly reproducible results with respect to heat transfer.

It is another object of the invention to provide a metallic insulation which remains stable under acceleration as well as pressure and temperature variations.

It is another object of the invention to provide a metallic insulation which can withstand relatively high temperatures.

It is another object of the invention to provide a thermal insulation which can be easily disposed in or on a pipe.

Briefly, the invention provides a thermal insulation which is comprised of a plurality of spatially deformed sheet metal elements which are disposed in coaxial relation and which define a plurality of cells for retarding heat transfer to and from a pipe wall. In this regard, the insulation can be disposed either on the inside of the wall or on the outside of the wall.

When in place on a pipe having a peripheral wall defining a flow path for a flowable medium, the sheet metal elements rest resiliently against the pipe wall and are aligned longitudinally of the pipe.

The thermal insulation provides cells which have walls which are almost impermeable in the longitudinal direction of the pipe so that, if a medium flows in the pipe, no parallel flow cooling the pipe occurs in the cells.

The sheet metal elements can be deformed into various shapes provided a plurality of cells are defined therebetween for retarding heat transfer to and from a pipe wall. For example, the elements may be individual elements which are made as hollow rings which are fitted into each other. In another embodiment, a single spatially deformed sheet metal strip may be wound in overlapping helix relation on itself relative to the pipe in order to define elements with the cells therebetween.

The method of providing thermal insulation on a pipe wall comprises the steps of providing a plurality of spatially deformed sheet metal elements, aligning the elements in a longitudinally aligned coaxial manner to define a plurality of cells therebetween and pushing the aligned elements into resilient engagement with the pipe wall in order to retard heat transfer to and from the pipe wall. In addition, overlapped regions of the aligned elements can be spot welded in order to secure the elements against mutual displacement.

In another embodiment of the method, a sheet metal strip can be deformed between two profiled rolls in steps and thereafter unilaterally stretched while being wrapped about a pipe wall in order to define a plurality of cells about the pipe wall for retarding heat transfer to and from the pipe wall.

These and other objects and advantages of the invention will become more apparent from the following detailed description and appended claims taken in conjunction with the accompanying drawings in which:

FIG. 1 illustrates a fragmentary longitudinal sectional view through a blind pipe and a re-entrant tube of a process heat exchanger having a thermal insulation according to the invention;

FIG. 2 illustrates a longitudinal section of a plurality of sheet metal elements making up a thermal insulation according to the invention;

FIG. 3 illustrates a plan view of one of the sheet metal elements of FIG. 2;

FIG. 4 illustrates a modified thermal insulation in accordance with the invention;

FIG. 5 illustrates a further modified thermal insulation in accordance with the invention;

FIG. 6 illustrates a further embodiment of a thermal insulation according to the invention placed on the outside surface of a pipe wall; and FIG. 7 illustrates a further modified thermal insulation in accordance with the invention on an outside surface of a pipe wall.

Referring to FIG. 1, a process heat exchanger is constructed, in part, for example of a blind pipe 1 which is rolled tightly at an open end into an aperture of a tube sheet 2 while a re-entrant pipe or tube 5 is concentrically arranged within the blind pipe 1. As indicated, the re-entrant tube 5 is braced laterally within the blind pipe 1 via several radial ribs 3, 4 which are distributed over the circumference of the tube 5 and is secured at an upper end in a tight manner in an aperture of a tube sheet 7.

The re-entrant tube 5 is provided on the inside with insulation 10 which extends over the entire length of the tube 5 (as indicated in broken line in FIG. 1). The insulation 10 is comprised of a plurality of spatially deformed sheet metal elements 11 which are aligned longitudinally of the pipe 5 and define a central passage for a flow of medium.

Each sheet metal element 11 is produced by deep-drawing and subsequent rolling-in and is in the form of a hollow ring. As shown, each element 11 has a cylindrical circular guide collar 15, a cylindrical circular plug-in collar 16 adjacent to and offset from the guide collar 15, a conical surface 17 which extends from the plug-in collar 16, a torous surface 18 which extends from the conical surface 17 and a counter-cone surface 19 which extends from the torous surface 18. As shown, the plug-in collar 16 is offset from the guide collar 15 by an amount equal to about the thickness of the element 11.

The individual sheet metal elements 11 are nested in such a manner that the inside surface of the guide collar 15 rests against the outside surface of a plug-in collar 16 of an adjacent sheet metal element 11. As shown in FIG. 1, the guide collar 15 of the bottom sheet metal element is seated on a terminating ring 20 which is connected to a lower end of the re-entrant pipe 5 via a welded seam 21. The uppermost sheet metal element, as viewed, is held in place by a support ring 22 of Z-profile which is welded to the upper end of the pipe 5.

When in place, the elements 11 rest resiliently against the wall of the re-entrant pipe 5 and define a plurality of cell for retarding heat transfer to and from the pipe wall. As shown in FIG. 1, the space between the re-entrant pipe 5 and the guide collars 15 is divided into annular cells with a medium such as air, gas or water which acts as an insulator proper, enclosed in the cells. The cells are short in the longitudinal direction of the pipe 5 so that no appreciable convection flow can develop therein. If the secondary medium, i.e. the medium within the cells, is a gas, an advantageous phenomenum occurs in that the viscosity of the gases increases considerably with increasing temperature. This phenomenum reduces also the development of convection flow.

Because of the multiplicity of cells, the elements 11 bring about an insulating effect on the pipe 5. In addition, the individual sheet metal elements 11 have a wall thickness in the range of 0.05 to 1 millimeter and the walls are, for the most part, inclined to the axis of the pipe 5. Thus, the radial heat flow through the elements 11 is relatively small. The small wall thickness and the absence of radial sheet metal walls also prevents dangerous thermal stresses from occuring in the sheet metal elements 11.

In order to fabricate the insulation 10, a plurality of the spatially deformed sheet metal elements 11 are aligned in a longitudinally aligned coaxial manner and thereafter slidably mounted in the pipe 5 by being pushed into resilient engagement with the wall of the pipe 5. Pushing can be carried out with the use of a fitting plunger.

The dimensions of the sheet metal elements 11 are such that the elements 11 rest with a slight radial pretension against the inside surface of the pipe 5.

During operation of the process heat exchanger, a primary medium of high temperature flows around the outside of the blind pipes 1 from below while a secondary medium flows through the annular space between the blind pipe 1 and the re-entrant pipe 5 as indicated by the arrow 25. During this time, the secondary medium absorbs heat from the primary medium. The direction of flow of the secondary medium which has assumed a high temperature due to heat absorption is then reversed at the lower end of each blind pipe 1 and is directed to flow upwardly through the re-entrant pipe 5. The insulation 10 then prevents the secondary medium from giving off an appreciable amount of heat to the re-entrant pipe 5 and, from there, to the secondary medium entering the annular space between the pipes 1, 5. The insulation thus improves the heat transfer from the primary to the secondary medium and, at the same time, protects the re-entrant pipe 5 in the upper part which is mechanically more highly stressed against the temperature of the heated-up secondary medium.

Referring to FIG. 1, each cell adjacent to a plug-in collar 16 of the insulation occupies almost the full width of the insulation 10. However, the radial width of each cell can be considerably reduced relative to the total thickness of the insulation. As shown in FIGS. 2 and 3, wherein like reference characters indicate like parts as above, the axial length of the plug-in collar 16' is greatly shortened and a radial wall section 26 follows the shortened collar 16'. This wall section 26 then merges into a conical wall section 27 which is connected to the conical surface 17. In this manner, a further cell is formed between the guide collar 15 and the wall sections 26, 27. In addition, each wall section 27 has a plurality of inwardly directed bump-like protuberences 30 which are distributed over the surface parallel to the axis of the element 11'. These protuberences 30 form guide surfaces for axially guiding the guide collar 15 of an adjacent element 11' therein so that, through nesting, a stack of elements 11' is formed as in FIG. 1. Such a stack can then be pushed into a re-entrant pipe 5 by means of a plunger.

As shown in FIGS. 1 and 2, the sheet metal elements 11 are formed as hollow rings with a cylindrical collar for guiding an adjacent element thereon. In this regard, the collars of the aligned elements 11 define a counter wall opposite the wall of the pipe 5 and serve as boundaries for the cells. Further, as shown in FIG. 1, the counter-cone surface 19 of each element 11 has a free edge adjacent the pipe wall which is bent in a direction away from the wall. However, various other shapes and cross-sections can be utilized.

Referring to FIG. 4, the thermal insulation may be formed of spatially deformed sheet metal elements 40 which are composed of two elements, namely, a ring shaped or annular intermediate element 41 and a ring shaped collar element 44. As shown, each intermediate element 41 has a W-shaped cross-section with slightly rolled-in ends while each collar element 44 has a similar basic shape, i.e. a W-shaped cross-section, disposed in inverted manner to the adjacent intermediate element 41. In addition, each collar element 44 has an axially extending leg 42, 43 at each periphery with the inner leg 42 forming a long ring wall which bridges the span to the adjacent sheet metal element 40 and thereby forms a counter wall parallel to the wall of the pipe 5. The outer leg 43 forms a short ring wall and extends beyond the intermediate element 41 as indicated. This short ring wall 43 can be slotted axially in several places to provide a certain amount of radial resiliency.

As shown, each intermediate element 41 is fitted into a collar element 44 with the W-shaped cross-sections disposed in an inverted manner with respect to each other to define a multiplicity of cells therebetween. In addition, stacking of the elements 40 on each other provides for the formation of additional cells between the respective elements 40.

Referring to FIG. 5, the sheet metal elements 45 may also be constructed to form a multiplicity of series-connected cells as viewed in the radial direction in excess of the two or three cells shown in FIGS. 2 and 4. For example, as shown in FIG. 4, each element 45 may form five series-connected cells. To this end, each element 45 has a sinusoidal-shaped cross-section consisting of six axial wall sections 46 which are connected at the ends via arch-shaped wall sections 47. The free end of the innermost and outermost wall sections 46 are drawn-in somewhat conically as viewed. The elements 45 which are fabricated by a drawing process are arranged alternately in the stack, i.e. in an inverted manner with respect to the adjacent elements 45. In addition, the insulation includes a plurality of sheet metal sleeves 48, which extend over several sheet metal elements 45 to form a counter wall to the wall on the pipe 5. In this manner, the elements 45 are in the form of hollow rings which are disposed between the pipe wall and the counter wall 48.

Referring to FIG. 6, the wall of a pipe or tube 50 may also be insulated on the outside by the thermal insulation. For example, as shown, the thermal insulation is in the form of sheet metal elements 55 each of which has a cross-section of multi-cup shape which is telescoped in an adjacent element. The elements 55 thus form three to four cells which are located on a radius. A counter wall is also formed, as in FIG. 1, by overlapping cylindrical edge portions 56 of the elements 55.

Referring to FIG. 7, the thermal insulation can be also formed by a spatially deformed sheet metal sheet or strip 60. As shown, the strip 60 is wound in helical overlapping relation on itself about the wall of a pipe or tube 50 with adjacent respective turns supporting and overlapping each other. As indicated, the strip defines a plurality of spirally extending cells between the overlying turns. When applying such strips, each strip 60 can be deformed between two profiled rolls (not shown) in steps while unilaterally stretching the deformed strip during wrapping about the pipe 50. The stretching should correspond to the larger circumference of the strip 60.

It is also possible to produce the profile of the strip 60 by using deep-drawn annular elements.

Referring to FIGS. 6 and 7, only one sheet metal element is shown in hatched manner for the sake of clarity. This, however, should not mean that the sheet metal elements could not also be simply slotted radially.

If large temperatures are to be encountered, it may be advisable to leave to the individual sheet metal elements or to the individual turns, a small amount of axial play at the connecting point with the adjacent sheet metal element or turn. Preferably, adjacent sheet metal elements or turns are connected to each other by spot welds in the vicinity of the counter-wall. Such spot welds, as a rule, are staggered relative to each other with respect to the direction of the axis. In this manner, adjacent spot welds do not lie on the same generatrix line.

Under some circumstances, the counter-wall need not be made of separate sleeves as shown in FIG. 5 but may be in the form of a long thin-walled tube. In this case, for instance, as shown in FIG. 4, the inner leg 42 of each collar element 44 is made resilient by cuts which extend in the axial direction. Optionally, tabs can be bent inwardly from the leg 42 to have the long tube rest resiliently thereon.

What is claimed is:

1. In combination,
a pipe having a peripheral wall defining a flow path for a flowable medium, and
thermal insulation slidably mounted on at least one side of said wall, said insulation including a plurality of spatially deformed sheet metal annular elements resting resiliently against said wall and aligned coaxially longitudinally of said pipe, said elements defining a plurality of annular cells therebetween for retarding heat transfer to and from said pipe wall.

2. The combination as set forth in claim 1 wherein each element is a hollow ring having a cylindrical collar for guiding an adjacent element thereon.

3. The combination as set forth in claim 2 wherein said collars of a plurality of aligned elements define a counterwall opposite said wall of said pipe.

4. The combination as set forth in claim 1 wherein said insulation further includes a counterwall spaced from and opposite to said pipe wall and wherein each said element is a hollow ring disposed between said walls.

5. The combination as set forth in claim 4 wherein said counterwall is a thin-walled tube.

6. The combination as set forth in claim 4 wherein said counterwall includes a plurality of aligned sleeves.

7. The combination as set forth in claim 1 wherein each element is of annular cup shape.

8. The combination as set forth in claim 1 wherein each element has a plurality of protuberances therein parallel to an axis of said element for axially guiding an adjacent element therein.

9. The combination as set forth in claim 1 wherein each element has a free edge adjacent said wall, said edge being bent in a direction away from said wall.

10. In combination,
a pipe having a peripheral wall defining a flow path for a flowable medium, and
thermal insulation on an outside of said wall, said insulation including at least one spatially deformed sheet metal strip wound in overlapping helix relation against said wall and aligned longitudinally of said pipe, said strip defining a plurality of turns supporting and overlapping each other and a plurality of spirally extending cells between overlying turns for retarding heat transfer to and from said pipe wall.

11. In combination,
a pipe having a peripheral wall defining a flow path for a flowable medium, and
thermal insulation slidably mounted on at least one side of said wall, said insulation including a plurality of spatially deformed annular sheet metal elements resting resiliently against said wall and aligned coaxially longitudinally of said pipe, each of said elements defining a plurality of radially staggered cells between adjacent elements reducing heat transfer to and from said pipe wall, said cells containing a stagnant part of the medium flowing on the element side of said pipe.

12. In combination,
a metallic pipe having a peripheral wall defining a flow path for a flowable medium, and
thermal insulation on the outside of said wall, said insulation including at least one spatially deformed helically wound sheet metal strip resting resiliently around and against said wall of said pipe, said strip defining a plurality of windings supporting and overlapping each other and between adjacent windings a plurality of radially staggered cells for reducing heat transfer to and from said pipe wall, said cells containing a stagnant part of the medium flowing on the outside of said wall.

* * * * *